United States Patent [19]

Labadie

[11] Patent Number: 4,786,293
[45] Date of Patent: Nov. 22, 1988

[54] SMART CONTROLLER FOR REVERSE PULSE AIR FILTER

[75] Inventor: Paul A. Labadie, Redondo Beach, Calif.

[73] Assignee: Farr Company, El Segundo, Calif.

[21] Appl. No.: 106,138

[22] Filed: Oct. 8, 1987

[51] Int. Cl.$^4$ ............................................. B01D 46/04
[52] U.S. Cl. ........................................ 55/21; 55/96; 55/272; 55/283; 55/302
[58] Field of Search ............. 55/21, 96, 272, 283, 55/302

[56] References Cited

U.S. PATENT DOCUMENTS

| | | | |
|---|---|---|---|
| 3,073,097 | 1/1963 | Hallett et al. | 55/283 |
| 4,277,255 | 7/1981 | Apelgren | 55/96 X |
| 4,319,897 | 3/1982 | Labadie | 55/302 |
| 4,322,231 | 3/1982 | Hilzendeger et al. | 55/302 X |
| 4,491,458 | 1/1985 | Sunter | 55/21 |
| 4,500,326 | 2/1985 | Sunter | 55/96 X |

Primary Examiner—Kathleen J. Prunner
Attorney, Agent, or Firm—Lyon & Lyon

[57] ABSTRACT

A control device for an air filter or dust collector equipped with a reverse pulse air cleaning system wherein the pressure differential across the air filter is continuously monitored and compared to a reference set point pressure differential. When the pressure differential across the air filter is greater than or equal to the reference set point pressure differential, a cleaning cycle is initiated. At the end of the cleaning cycle a new pressure differential across the air filter is measured and compared to the pressure differential before cleaning. If the new pressure differential is lower, it is stored and another cleaning cycle is initiated. This cycle is repeated until the "after" pressure differential is equal to or greater than the "pre-cleaning" pressure differential. At this point, a new reference set point pressure differential is calculated and the initial monitoring cycle is repeated until the pressure differential across the filter becomes equal to or greater than the new reference set point. The above described cleaning cycle is then repeated.

8 Claims, 6 Drawing Sheets

FIG_3

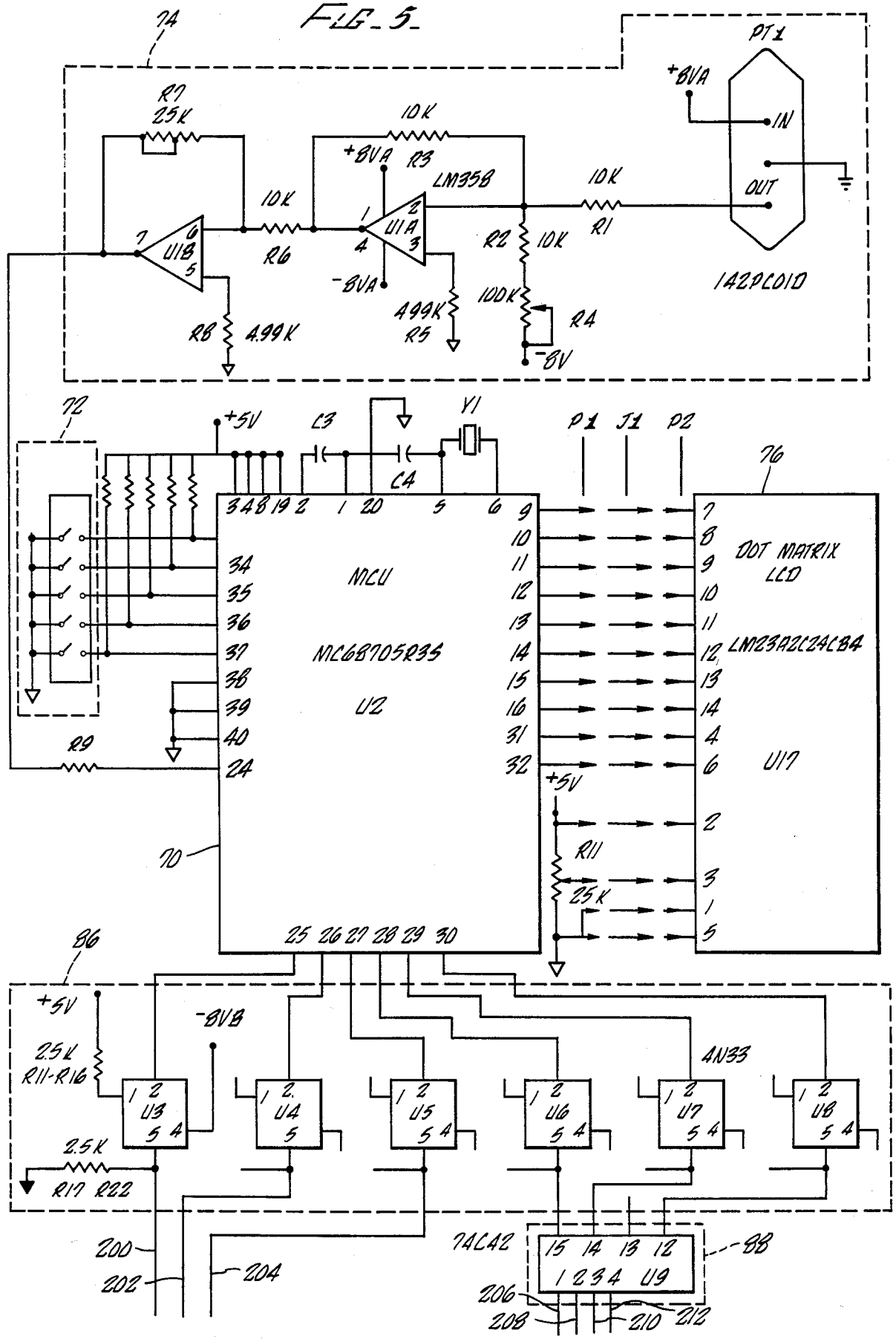

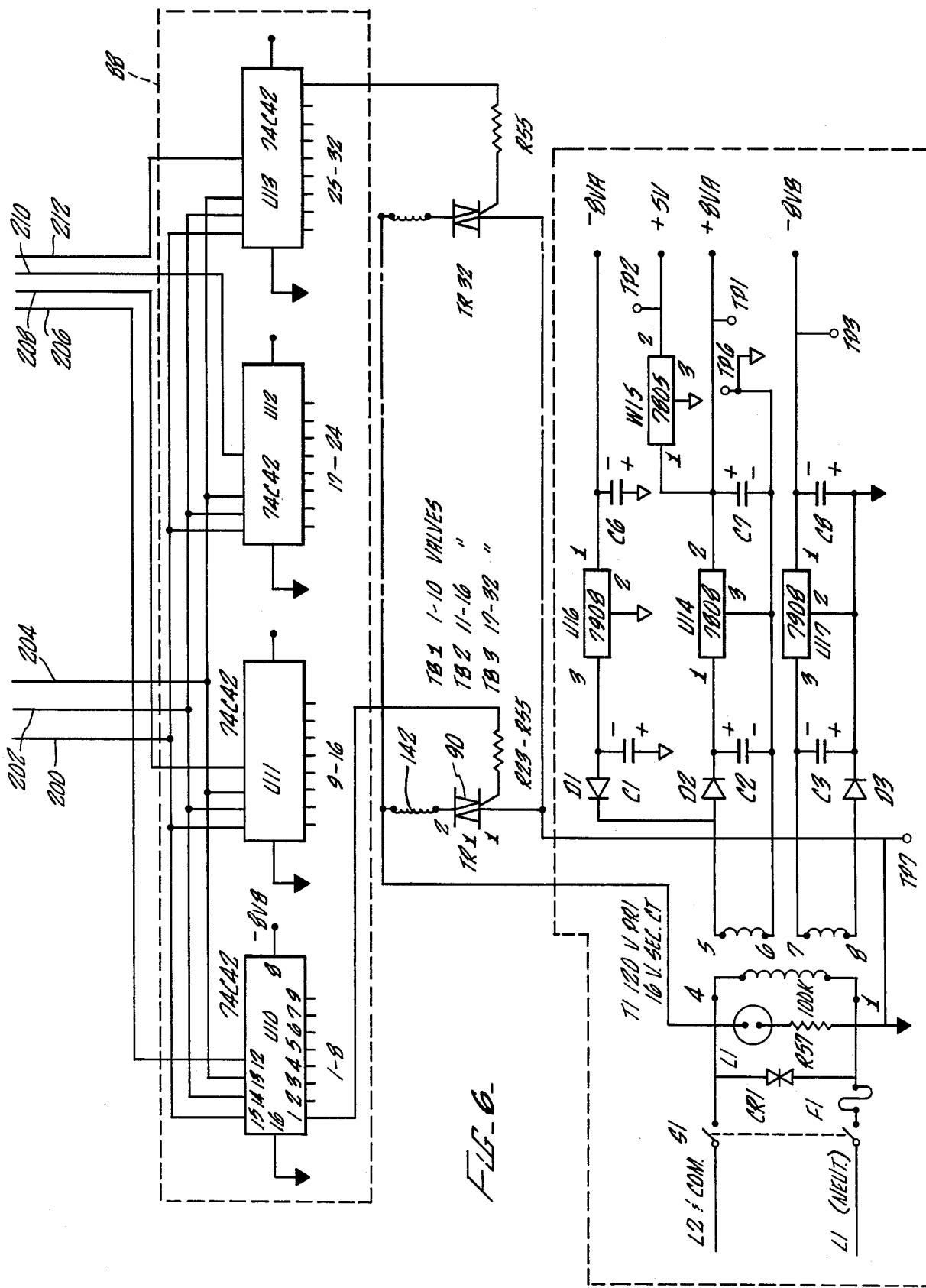

SMART CONTROLLER FOR REVERSE PULSE AIR FILTER

BACKGROUND

Present air filter controllers used on self-cleaning reverse pulse air filters and dust collectors initiate a cleaning cycle on either a fixed or adjustable time interval. Such operation does not take into account various conditions experienced by such filters or dust collectors, resulting in less than optimum performance.

Self-cleaning air filters and dust collectors of the reverse pulse type, such as that shown in U.S. Letters Pat. No. 4,319,897, the teachings of which are incorporated herein by reference, perform a filter cleaning operation by opening a compressed air valve for a short period of time. The resulting blast of compressed air is normally directed into a venturi or eductor tube to entrain a much larger volume of secondary air and develop the static pressure required to force this air back through the filter in a direction opposite to the normal air flow therethrough. It is normal practice to clean or pulse no more then 10% of the filters at one time. This leads to the use of 4 to 26 valves depending on the air flow capacity or size of the air filter or dust collector. Thus, to perform a cleaning cycle it is necessary to provide a means to turn on each compressed air valve in sequence for a prescribed period of time and with a prescribed time interval between pulses.

Currently available controllers do nothing more than turn valves on and off in sequence. The basic timer-type controller operates either continuously or is initiated on the closure of an adjustable pressure switch. Since the pressure loss across the filters increases continuously over the life of the filters, even the pressure switch controlled timer will revert to continuous cleaning unless the set point is frequently increased. These devices require continuous manual attention to fully utilize the life expectancy of a filter.

SUMMARY OF THE INVENTION

The present invention relates to an air filter or dust collector equipped with a reverse pulse air cleaning system. The pressure differential across the air filter is continuously monitored and compared to a reference set point pressure stored in memory. When the pressure differential across the air filter is equal to or greater than the reference set point pressure, the filter pressure differential value is stored in memory and a cleaning cycle is initiated. At the end of the cleaning cycle the final pressure differential is measured and compared to the pressure differential stored in memory at the beginning of the cleaning cycle. If the final pressure differential is lower than the stored pressure differential, the final pressure differential is stored and the cleaning cycle is repeated. As long as the final pressure differential after a cleaning cycle is lower than the last previous stored pressure differential, the cleaning cycle is repeated. If the final pressure differential is equal to or greater than the last previous stored pressure differential, then a new reference set point is calculated by adding 0.2" w.g. to the final pressure differential. The initial monitoring cycle is then repeated until the pressure differential across the filters becomes equal to or greater than the new set point at which time the above described cleaning cycle is repeated.

This procedure optimizes the cleaning cycle and increases the life expectancy of the filter by providing a low initial reference set point which initiates a cleaning cycle while the filter bags or cartridges are still relatively easy to clean because of their low air flow resistance. The cleaning cycle is repeated if the pressure drop across the filter bags or cartridges at the end of the cleaning cycle is lower than it was at the beginning of the cleaning cycle. In this manner, the cleaning cycle is repeated continuously until the pressure drop at the end of the cleaning cycle is no less than it was at the beginning of the cycle. This procedure thus ensures that the filters are as clean as possible at the end of a cleaning sequence. Then at the end of a single or multiple number of cleaning cycles, when there is no further reduction in pressure loss across the filters, 0.2" w.g. is added to the final pressure differential value to obtain a new reference set point value. The pressure differential across the filters is measured at frequent intervals and compared to the reference set point value so that the cleaning cycle can be initiated as soon as the pressure differential reaches this value. This procedure maximizes the life expectancy of the filter or dust collector by keeping the filters cleaner without excessive cleaning, does not require constant manual attention or adjustment of the set point and minimizes the consumption of compressed air as well as wear and tear on the filters and compressed air valves.

Accordingly, it is the object of the present invention to provide a control system for automatically controlling the cleaning of an air filter or dust collector equipped with reverse air pulse cleaning apparatus wherein the cleaning procedure maximizes the life expectancy of an air filter.

It is another object of the invention to provide an automatic system which eliminates the requirement for manual observation and adjustment of the cleaning cycle.

These and other objects and advantages of the present invention will become apparent from the following detailed description taken in conjunction with the accompanying drawings.

BRIEF DESCRIPTION OF THE DRAWINGS

FIGS. 5 and 6 are a schematic diagram of the system shown in FIG. 3.

DESCRIPTION OF THE PREFERRED EMBODIMENT

Figure 1:
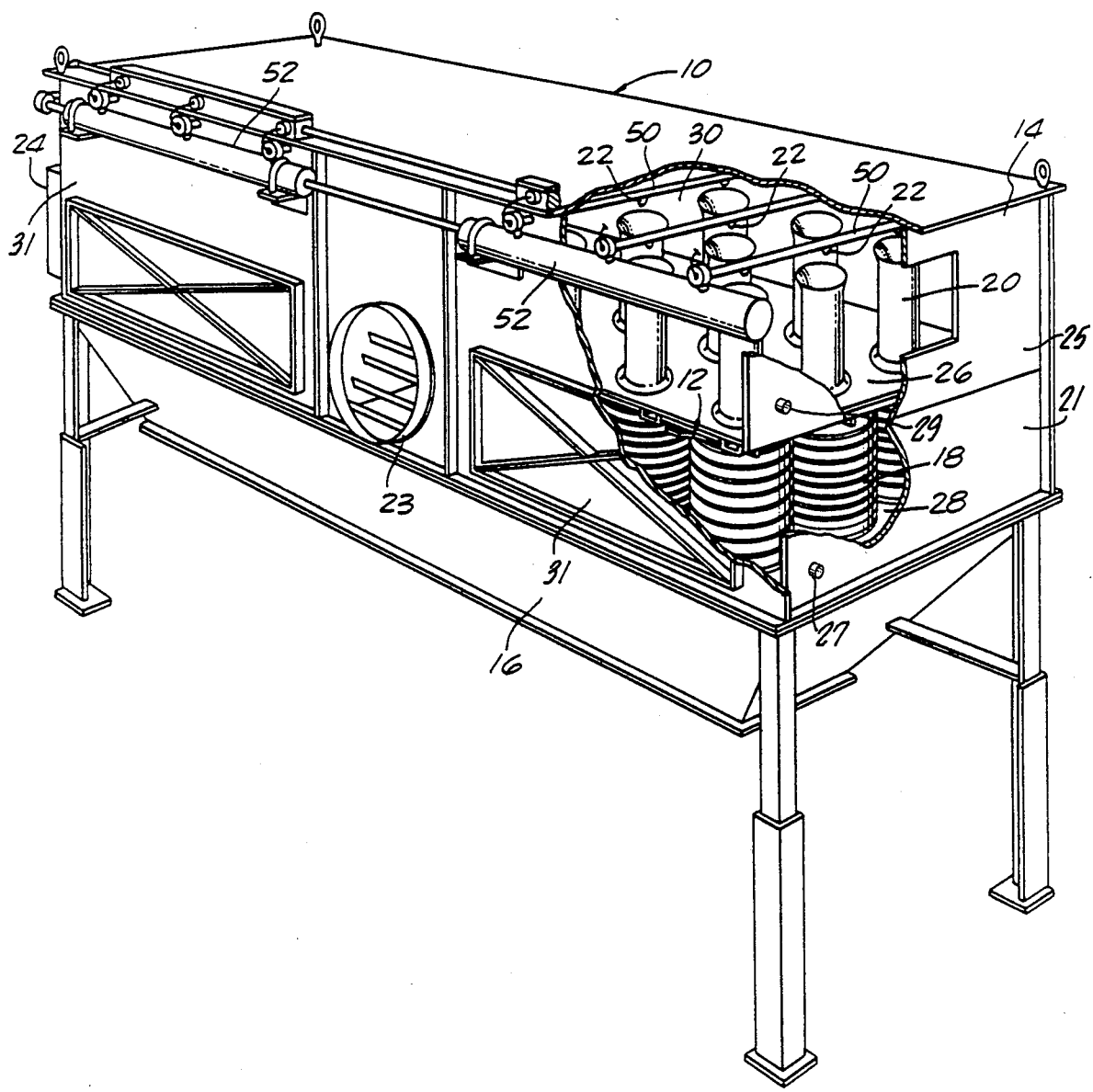
FIG. 1 is a partial section view of a reverse pulse type dust collector assembly.

Referring now in detail to the drawings, a filter assembly 10 using a ejector tube jet pump 20 is illustrated in FIG. 1. As seen therein, the filter assembly is comprised of a large housing 14, a lower hopper 16 for collecting the filtered dust or other foreign matter, a plurality of cylindrical pleated filter elements 18, a corresponding plurality of ejector tubes 20 and back pulsing nozzles 22. The filter housing 14 has a lower air inlet 23, an upper air outlet 24, and the interior thereof is partitioned by horizontal diaphragm plate 26 into a lower dirty air chamber 28 and upper clean air chamber 30. The filter assembly has doors 31 therein providing access to the lower chamber 28 and the filter elements 18 mounted therein. The lower chamber 28 is opened at its lower end so that foreign matter filtered from the air can fall freely into the hopper 16. The lower chamber communicates with the upper chamber through a plurality of apertures 32 (see FIG. 2) in the diaphragm plate 26. The filter elements 18 are removably mounted within the lower chamber 28 and held against the diaphragm plate 26 by a locking mechanism 12 such that they depend from the diaphragm plate.

Figure 2:
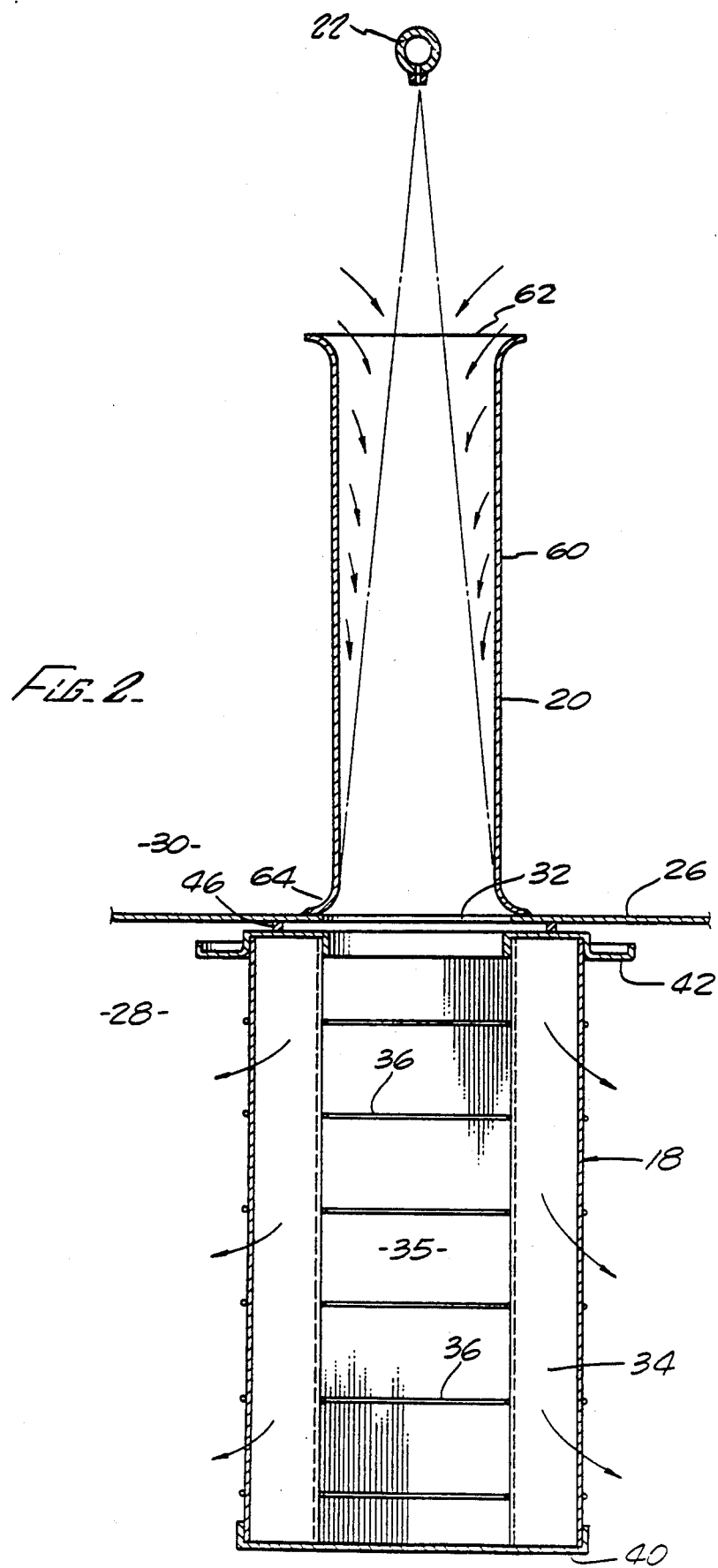
FIG. 2 is an enlarged sectional view of an ejector tube shown mounted over a filter element and illustrating the air flow there through during back pulsing.

Each element, as shown in FIG. 2, is comprised of pleated paper filter medium 34 which is formed into a cylindrical configuration to define a hollow interior 35. The medium can be supported in this configuration by a helical wrap 36 around the outer surface of the medium with twine which has been pre-coated with a suitable adhesive. Of course, other means of supporting the pleated filter medium could also be employed. The lower ends of the filter elements are sealed by end plates 40 and a mounting plate 42 is secured about the open upper end of the filter elements. A suitable gasket 46 is secured to the mounting plate about the open upper end of the filter elements for effectuating an air tight seal with the diaphragm plate 26 when the filter element is pressed there-against by the locking mechanism 12.

A plurality of ejector tubes 20 are secured to the diaphragm plate 26 directly above the apertures 32 therein so that air passing through the pleated walls of the filter elements 18 flows upwardly through the interior of the filter element, through the apertures 32 in the diaphragm plate, through the ejector tubes and into the clean air chamber or plenum 30. Disposed directly above the open ends of the ejector tubes are a plurality of air nozzles 22. These nozzles depend from flow pipes 50 (FIG. 1) which are in fluid communication through manifolds 52 with a source of air pressurized at about 70-100 psig.

In operation, dust laden air is forced into the lower chamber 28 of the filter housing 14 where it is directed by baffles or other suitable manifold means (not shown) to the cylindrical filter elements 18. As air passes through the pleated filter media and into the interior of the filter elements, the dust and other foreign matter carried thereby is filtered from the air flow. The clean air passes upwardly through the ejector tubes into the upper clean air chamber 30 and exits the filter housing through the clean air outlet 24.

To remove accumulated foreign matter from the walls of the filter elements 18, pulses or jets of pressurized air are periodically emitted from the nozzles 22 down the ejector tubes and into the interior of the filter elements 18. The manner in which this cleaning process is controlled will be described with reference to FIGS. 3 through 6. To effectively clean the filter elements, it is necessary to provide a jet pump which can deliver a considerably larger volume of air into the interior of the filter element as compared to the volume of primary air emitted from a nozzle 22. It has been found that a back pulse of about 1250 cfm against a head of about 10" w.g. provides excellent cleaning of the filter elements.

The configuration of the ejector tube is best seen in FIG. 2. As shown therein, the ejector tube 20 is comprised of a constant radius cylindrical sidewall portion 60, and upper bell-mouth opening 62 and a similarly configured lower bell-mouth opening 64. Each ejector tube 20 has a height of about 21 inches, this substantially vertical constant radius cylindrical sidewall portion 60 defines a tube diameter (D) of about 6" which flares outwardly at its open bell-mouth ends 62 and 64 along a radius of 1.8" to define an open upper end diameter of about 8". This configuration defines a length to diameter ratio of 3.5. It has been found that to provide sufficient entrainment of secondary air and diffusion of the primary and secondary air, a minimum length to diameter of 3 is preferred with the optimum being approximately 3.5 to 4. Further advantages of this arrangement are described in the U.S. Pat. No. '897 previously mentioned.

Figure 3:
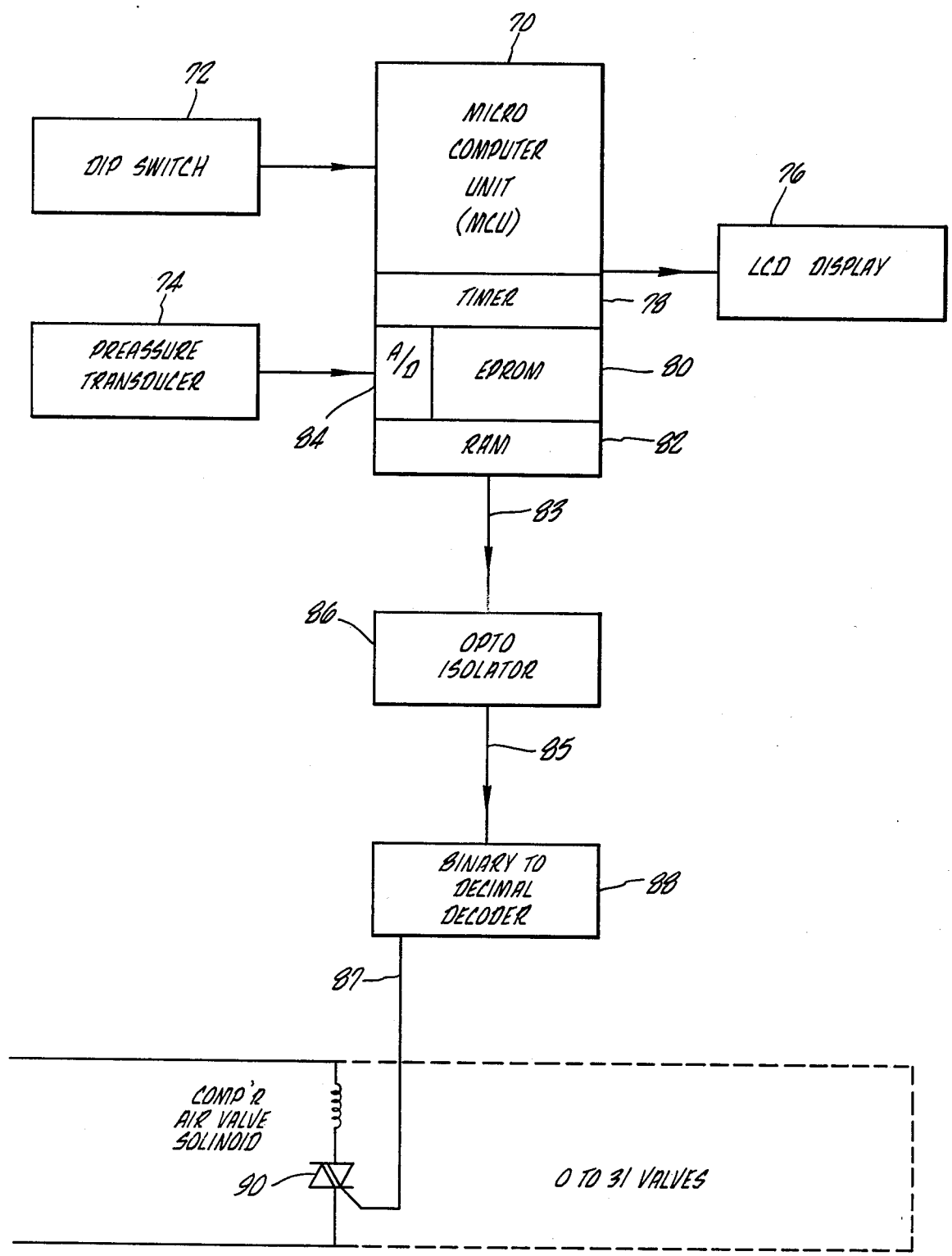
FIG. 3 is a block diagram of the present invention showing the major functional components of the electronic controller for controlling the cleaning system.

FIG. 3 is a block diagram of the major functional components of the electronic control system of the present invention. The central component is a microcomputer unit 70, containing an A to D converter 84, a timer 78 and both Ram 82 and Eprom 80 memory. The microcomputer 70 accepts information from a 5 section dip switch 72 which is pre-programmed to indicate the number of air valves to be pulsed. Microcomputer 70 also accepts an analog pressure signal from a pressure transducer 74 which is proportional to the pressure drop across the filters. Pressure tubes are connected between the pressure transducer 74 and air ports 27 and 29. These air ports extend through side panels 21 and 25 (FIG. 1) and into the dirty air chamber 28 and the clean air chamber 30 so that pressure transducer 74 can measure the pressure drop accross the filter elements 18. The analog pressure signal is digitized by means of an on-board A to D converter 84. Processed information is sent to the LCD display 76 in the form of three messages. The first message is collector pressure or the pressure differential across the filter. The second message is the reference set point pressure and the third message is the number of the valve that has been pulsed. The initial reference set point pressure is 0.2" w.g. which preferably is less than the clean filter pressure drop and is stored in Eprom. This value is selected at power ON to ensure that a cleaning sequence is initiated each time the unit is turned on.

The first and second messages are displayed continuously while the controller is in a filter pressure drop monitoring mode and messages one and three are displayed during a cleaning cycle. A 5 bit binary encoded valve select signal is generated by microcomputer 70 and is sent on lines 83 and 85, through optoisolators 86 and to a binary to decimal decoder 88. An enable pulse of 0.1 second duration is also sent to the decimal decoder 88 which then outputs a valve "OPEN" signal on line 87 to solid state AC switches (Triacs) 90 in sequence. This in turn energizes a solenoid valve which turns on the compressed air valve allowing compressed air to flow from pulsing nozzle 22 (FIG. 2) through the ejector tube 20 and into the interior portion of filter element 18.

Figure 4:
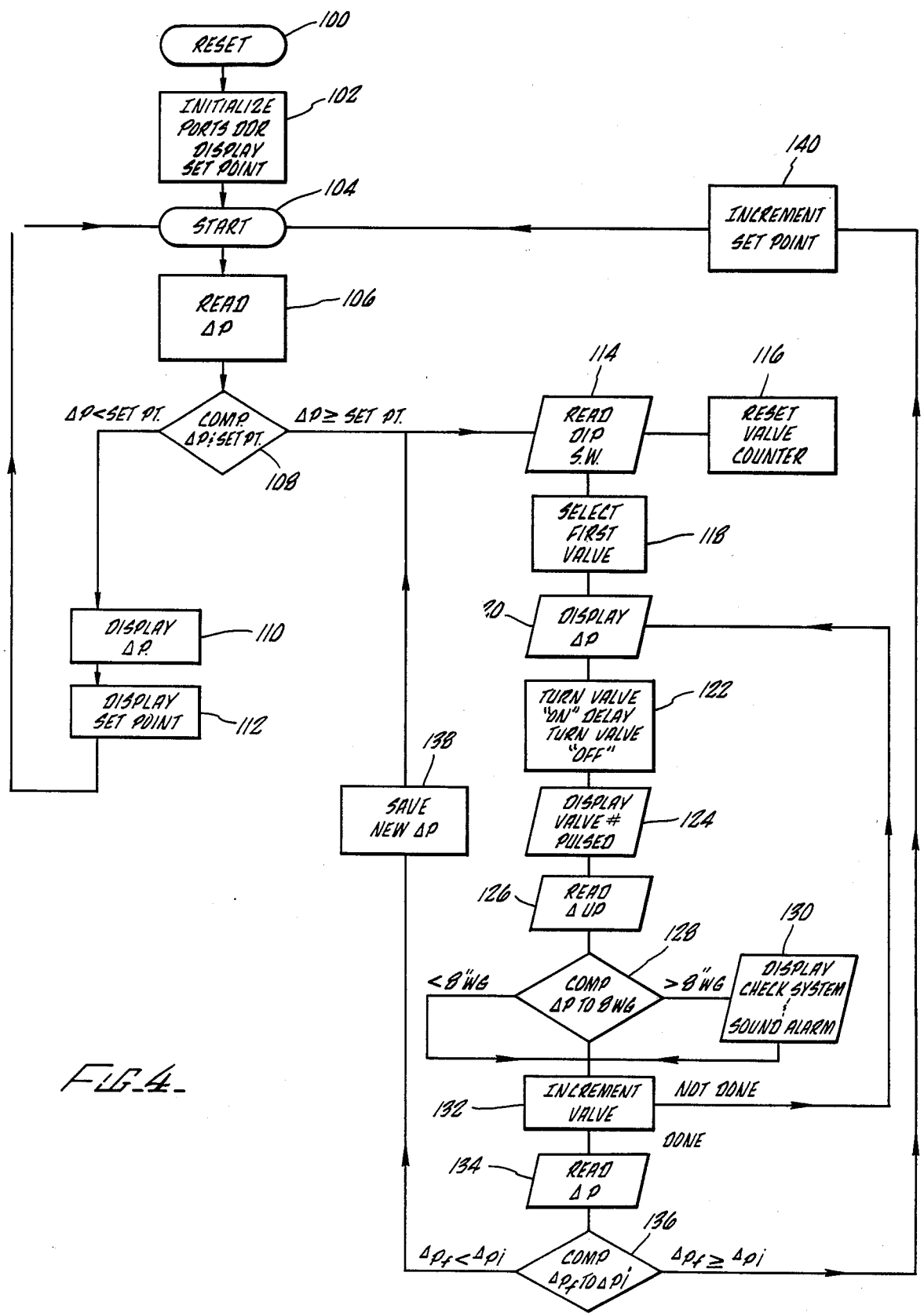
FIG. 4 is a flow chart for a computer program showing the major program functions of the cleaning cycle.

FIG. 4 is a flow chart showing the major program functions of the present invention that are stored in the Eprom 80 of FIG. 3. After a system power ON, which causes the microcomputer 70 to reset, the I/O ports and their data direction registers of the microcomputer 70 are initialized as indicated in blocks 100 and 102. The LCD display 76 (FIG. 3) is also initialized and the initial set point of 0.2" w.g. is stored in Ram 82. The pressure measuring cycle is started as indicated in block 104 by reading the pressure drop across the filters, block 106, and comparing that pressure to the set point pressure as indicated in block 108. If the pressure drop is less than the set point value, messages one and two are displayed as shown in blocks 110 and 112. There are two 5 second time delays embedded in this loop so the filter pressure drop is measured and compared to the set point pressure every 10 seconds.

When the filters collect dust and the pressure drop across them becomes approximately equal to or greater than the reference set point value, block 108, then the filter pressure drop value is stored in memory and the program branches to a cleaning cycle routine initiated in block 114. In this sequence, the dip switch 72 (FIG. 3) is read to determine the number of valves to be pulsed and the first valve is selected in block 118. The filter pressure differential is then displayed, block 120, and the first valve is turned on and off, block 122. The number of the valve pulsed is then displayed, block 124. The pressure differential across the filter is reread as indicated by block 126. The pressure differential across the filter is then compared to a value of 8" w.g. to determine if the pressure differential has reached that value as indicated in block 128. If the pressure differential across the filter is greater than or equal to 8" w.g., the program branches to block 130 which causes a "check system" message to be displayed on LCD display 76 and sounds an alarm for 1 second after each valve is pulsed. The pressure at which a "check system" message is displayed, in this example 8" w.g., is selected by taking into account the type of filter system being cleaned and the maximum pressure differential that still allows effective and efficient cleaning. In most systems it is not efficient to exceed a pressure differential of 8" w.g. If the pressure differential is less than 8" w.g., the valve counter located in the ram 82 of microcumputer 70 is incremented as shown in block 132. If all the valves have not been pulsed the program loops back and displays the latest filter pressure differential value, block 120. Blocks 120 through 132 are repeated until all the valves have been pulsed. When all the valves have been pulsed, the pressure differential is read as shown in block 134 and then compared in block 136 to the pressure differential value saved at the beginning of the cleaning cycle. If the pressure drop is lower, at the end of the cycle, the new pressure differential value is saved a shown in block 138 and the cleaning cycle, starting with block 114, is repeated. If the pressure differential across the filter has not decreased or has increased, the set point value is incremented in block 140 to a valve which is 0.2" w.g. greater than the last differential pressure reading and the program branches to the start block 104. A set point increment of 0.2" w.g. has been found to be the most effective increment value for maximizing the life expectancy of the filter as well as the efficient operation of the cleaning system. There are also two 5 second delays embedded in the cleaning cycle routine which provide a 10 second time interval between valve pulses.

The major advantages of this control system are that a programmable reference set point is set at a low value each time the controller is turned ON and is subsequently incremented to a higher value only after the cleaning cycle causes no further decrease in the pressure differential across the filters. In this manner, the controller initiates a cleaning cycle based on an increase in filter pressure drop or dust load on the filters. The cleaning is initiated on a demand or as required basis rather than on an arbitrary fixed set point value. The low initial set point value is beneficial because clean filter elements can be cleaned more effectively. By initiating a repetitious cleaning cycle when successive cleaning cycles cause a drop in pressure differential, the lowest possible filter pressure drop after the initiation of each cleaning cycle is insured. The fixed valve "on" time of 0.1 second, which has been proven by test to be an optimum value, cannot be misadjusted by the user. This system also prevents the continuous pulse operation which is common with existing controllers and which prematurely wears out air valves, filter elements and wastes compressed air. Also, the fully automatic operation, with no user adjustments required, minimizes the necessity for operator attention and control.

FIGS. 5 and 6 shown a detailed schematic diagram of the present invention. Lines 200, 202, 204, 206, 208, 210 and 212 of FIG. 5 connect to lines 200, 202, 204, 206, 208, 210 and 212 respectively of FIG. 6. Block 74 as shown in FIG. 5 corresponds to the pressure transducer and its associated signal processing circuitry indicated in FIG. 3. Dip switch 72 is shown in FIG. 5 along with the microcomputer 70 and the LCD display 76. The optoisolators 86 and the binary to decimal decoders 88 of FIG. 3 are also shown in FIGS. 5 and 6. Triac 90 is shown in FIG. 6 and FIG. 3 and the associated power supply circuitry is shown in block 150 in FIG. 6. In FIG. 6, solenoid 142 is activated by a pulse transmitted to triac 90. There are up to a total of 32 triacs controlling 32 solenoids as indicated in FIG. 6.

The control system of the present invention, as described with reference to FIGS. 3 through 6, is shown in the mechanical apparatus of the U.S. Pat. No. '897 previously mentioned. However this control system can be used in a number of different types of cleaning apparatuses such as bag houses, gas turbine air inlet filters and similar reverse pulse air cleaning devices.

While the preferred embodiment of the system of the present invention has been illustrated and described, certain modifications and alternatives will be apparent to those skilled in the art and the present disclosures intended to include such modifications and alternatives within the scope of the appended claims.

What is claimed is:

1. A gas filter cleaning system comprising:
   a housing,
   a plurality of filter means disposed within said housing and adapted to remove particulate matter from a gas forced through said filter means in a forward direction;
   a corresponding plurality of reverse pulse means disposed within said housing and aligned with said filter means for causing a pressurized gas to flow through said filter means in a reverse direction and remove particulate matter accumulated on said filter means;
   pressure sensing means operatively connected to said housing for measuring a pressure differential across said filter means when said gas is forced through said filter means in a forward direction and for generating a pressure differential value; and
   control means operatively connected to said pressue sensing means for receiving said pressure differential value and operatively connected to said reverse pulse means for activating one or more of said reverse pulse means, said control means including means for storing a reference set point therein, means for comparing said pressure differential value to said referece set point, means for activating one or more of said reverse pulse means when said pressure differential value approximately equals or is greater than said reference set point thereby causing a cleaning cycle wherein one or more of said filter means are cleaned, means for comparing the pressure differential value generated by said pressure sensing means prior to said cleaning cycle with a pressure differential value generated by said pressure sensing means following said cleaning cycle, means for increasing said reference set point in said storage means by a predetermined amount upon the pressure differential value generated after said cleaning cycle being equal to or greater than the pressure differential value generated prior to said cleaning cycle and means for reactivating said one or more of said reverse pulse means upon the pressure differential value generated after said cleaning cycle being less than the pressure differential value generated prior to said cleaning cycle.

2. A system as in claim 1 wherein:
said means for increasing said reference set point increases said reference set point by approximately 0.2" w.g. upon the pressure differential value generated after said cleaning cycle being equal to or greater than the pressure differential value generated prior to said cleaning cycle.

3. A system as in claim 2 wherein:
said control means includes means for monitoring said pressure differential value after said means for increasing said reference set point has increased said reference set point by said 0.2" w.g.; and
means for comparing said pressure differential value to said increased reference set point and for causing said means for activating one or more of said reverse pulse means to activate said reverse pulse means when said pressure differential value approximately equals or is greater than said increased reference set point thereby causing said cleaning cycle.

4. In a pulse jet air filtration system of the type comprising a housing, a plurality of filter elements disposed within the housing for removing particulate matter from an air flow forced through the filter elements in a forward direction and reverse pulse means for causing pressurized air to flow through the filter elements in a reverse direction and remove particulate matter accumulated on the filter elements, the improvement comprising:
pressure sensing means operatively connected to said housing for measuring a pressure differential across said filter elements when said air is forced through said filter elements in a forward direction and for generating a pressure differential value; and
control means operatively connected to said pressure sensing means for receiving said pressure differential value and operatively connected to said reverse pulse means for activating one or more of said reverse pulse means, said control means including means for storing a reference set point therein, means for comparing said pressure differential value to said reference set point, means for activating one or more of said reverse pulse means when said pressure differential value approximately equals or is greater than said reference set point thereby causing a cleaning cycle wherein one or more of said filter elements are cleaned, means for comparing the pressure differential value generated by said pressure sensing means prior to said cleaning cycle with a pressure differential value generated by said pressure sensing means following said cleaning cycle, means for increasing said reference set point in said storage means by a predetermined amount upon the pressure differential value generated after said cleaning cycle being equal to or greater than the pressure differential value generated prior to said cleaning cyle and means for reactivating said one or more of said reverse pulse means upon the pressure differential value generated after said cleaning cycle being less than the pressure differential value generated prior to said cleaning cycle.

5. A system as in claim 4 wherein:
said means for increasing said reference set point increases said reference set point by approximately 0.2" w.g. upon the pressure differential value generated after said cleaning cycle being equal to or greater than the pressure differential value generated prior to said cleaning cycle.

6. A system as in claim 5 wherein:
said control means includes means for monitoring said pressure differential value after said means for increasing said reference set point has increased said reference set point by said 0.2" w.g.; and
means for comparing said pressure differential value to said increased reference set point and for causing said means for activating one or more of said reverse pulse means to activate said reverse pulse means when said pressure differential value approximately equals or is greater than said increased reference set point thereby causing said cleaning cycle.

7. A method of controlling the cleaning cycle of filter elements in an air filtration system of the pulse jet type comprising the following steps:
(a) monitoring a pressure differential across the filter elements;
(b) activating a cleaning cycle when the pressure differential across the filter elements equals or exceeds a reference set point;
(c) increasing the reference set point by a predetermined amount to a larger value if the pressure differential across said filter elements after said cleaning cycle is greater than or equal to the pressure differential prior to said cleaning cycle and activating another cleaning cycle when the pressure differential across the filter elements equals or exceeds the larger value of the reference set point; or
(d) activating another cleaning cycle if the pressure differential following said cleaning cycle is less than the pressure differential prior to said cleaning cycle; and
(e) repeating the aforesaid steps.

8. A method of controlling the cleaning cycle of filter elements in an air filtration system of the pulse jet type comprising the following steps:
(a) sensing a pressure differential across the filter elements when air is forced therethrough in a forward direction;
(b) generating a pressure differential value corresponding to said pressure differential;
(c) comparing the pressure differential value with a reference set point;
(d) activating a cleaning cycle when the pressure differential value approximately equals or exceeds said reference set point;

(e) comparing the pressure differential value following said cleaning cycle to the pressure differential prior to said cleaning cycle;

(f) increasing said reference set point by a predetermined amount if said pressure differential following said cleaning cycle is greater than or equal to said pressure differential prior to said cleaning cycle;

(g) activating another cleaning cycle if said pressure differential following said cleaning cycle is less than said pressure differential prior to said cleaning cycle; and (h) repeating the aforesaid steps.

* * * * *